(12) United States Patent
Sim et al.

(10) Patent No.: US 8,359,659 B2
(45) Date of Patent: Jan. 22, 2013

(54) METHOD AND APPARATUS FOR PROTECTING PRIVATE INFORMATION ON A USER APPARATUS

(75) Inventors: Wong Hoo Sim, Singapore (SG); Teck Chee Lee, Singapore (SG); Aik Tat Tan, Singapore (SG); Guan Chuan Choo, Singapore (SG)

(73) Assignee: Creative Technology Ltd, Singapore (SG)

( * ) Notice: Subject to any disclaimer, the term of this patent is extended or adjusted under 35 U.S.C. 154(b) by 1573 days.

(21) Appl. No.: 11/165,874

(22) Filed: Jun. 24, 2005

(65) Prior Publication Data

US 2006/0294599 A1    Dec. 28, 2006

(51) Int. Cl.
*G06F 1/26* (2006.01)
(52) U.S. Cl. ............................. 726/34; 713/166; 713/183
(58) Field of Classification Search ...................... 726/34
See application file for complete search history.

(56) References Cited

U.S. PATENT DOCUMENTS

| | | | | |
|---|---|---|---|---|
| 5,708,777 | A * | 1/1998 | Sloan et al. | 726/18 |
| 6,647,497 | B1 * | 11/2003 | Cromer et al. | 726/16 |
| 6,766,456 | B1 * | 7/2004 | McKeeth | 726/2 |
| 6,816,974 | B1 * | 11/2004 | Nurmi et al. | 726/16 |
| 7,325,144 | B2 * | 1/2008 | Irisawa et al. | 713/185 |
| 7,346,769 | B2 * | 3/2008 | Forlenza et al. | 713/151 |
| 2003/0154386 | A1 * | 8/2003 | Wittkotter | 713/193 |
| 2006/0101275 | A1 * | 5/2006 | Daniels et al. | 713/182 |
| 2006/0236118 | A1 * | 10/2006 | Goldberg | 713/185 |

OTHER PUBLICATIONS

Felkey, Bill and Fox, Brent. PDA Interface-Privacy, Confidentiality and Security for PDAs hospital Pharmacy, vol. 38 No. 4 Apr. 2003 Retrieved on Sep. 22, 2006 from Internet http://www.factsandcomparisons.com/assets/hospitalpharm/apr2003_pda.pdf See p. 387 col. 3 lines 3-17.
Chapter 21 Security preference Handbook for the Palm Tungsten T3 Handheld © 1998-2003 retrieved on Dec. 1, 2006 from Internet http://www.palm.com/us/support/handbooks/tungstent3/TungstenT3_HB-ENG.pdf See pp. 342-344.
SmartDisk FlashTrax User Guide © 2003 Retrieved on Dec. 1, 2006 from Internet http://www.smartdisk.com/Support/Manuals/FlashTrax/FlashTraxUsersGuide.pdf See p. 3.

* cited by examiner

*Primary Examiner* — Kambiz Zand
*Assistant Examiner* — Amare F Tabor
(74) *Attorney, Agent, or Firm* — Creative Technology Ltd

(57) ABSTRACT

There is provided apparatus comprising a user interface for displaying a plurality of items. The apparatus is arranged: a) to receive at least one instruction, by which instruction or instructions, one or more of a plurality of items initially displayed on the user interface is or are categorized as an item or items to be hidden and the remaining one or more of the plurality of items initially displayed on the user interface is or are categorized as an item or items to be displayed; b) to receive an instruction to hide, from the user interface, the one or more items to be hidden; and c) to hide from the user interface, the one or more items to be hidden, such that the item or items categorized as items to be displayed are displayed on the user interface, and the item or items categorized as items to be hidden are not displayed on the user interface. In one preferred arrangement, the apparatus is an electronic device. There is also provided a method for hiding one or more items of a plurality of items displayed on a user interface for a user apparatus. Again, the user apparatus may be an electronic device. There is further provided a method for selecting a new password or entering a predetermined password on a user apparatus. The user apparatus may be an electronic device for storing electronic files.

21 Claims, 7 Drawing Sheets

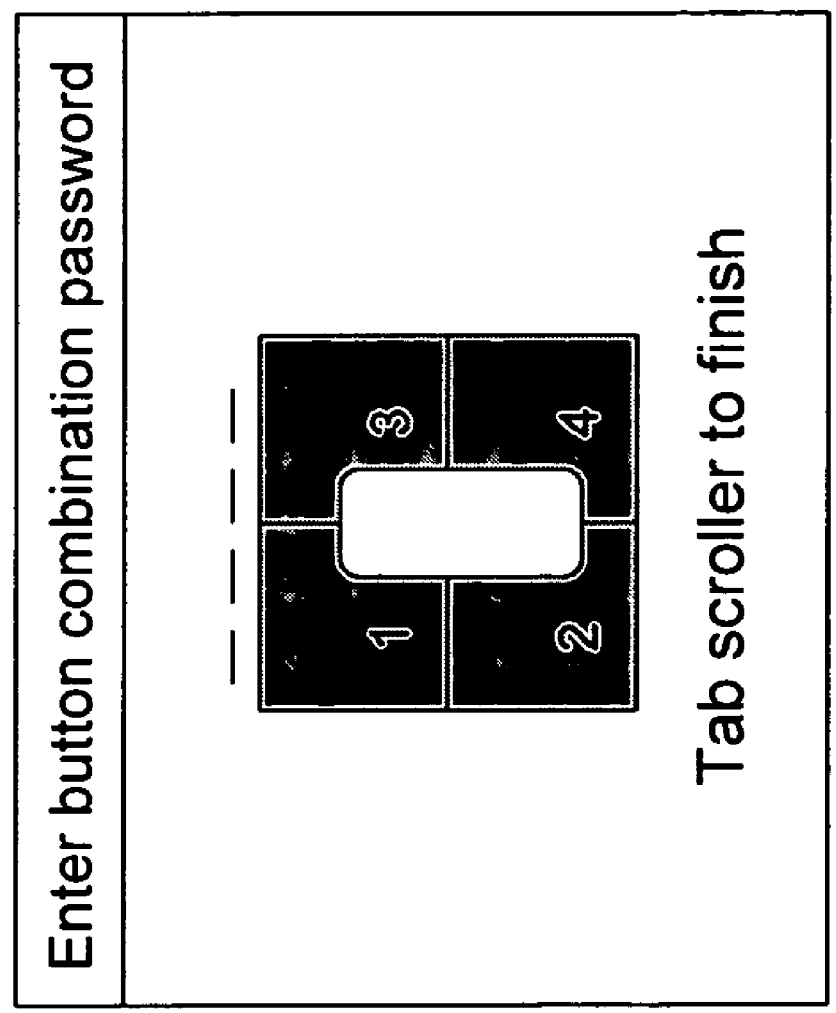

METHOD AND APPARATUS FOR PROTECTING PRIVATE INFORMATION ON A USER APPARATUS

FIELD OF THE INVENTION

The invention relates to a method and apparatus for hiding one or more items on a user interface on a user apparatus. The invention further relates to a method for entering a new password or selecting a predetermined password on a user apparatus.

BACKGROUND OF THE INVENTION

It is becoming more and more common to store items such as digital photographs, video files or music files on an electronic device (such as a personal digital entertainment (PDE) device) or a personal computer (PC). Some of the stored files or folders may be personal to the user and not for general viewing. Some users would like to be able to mark certain files or folders as private if another user is using their device or to protect their private content if the device is lost or stolen. The ability to determine which files or folders can be viewed by another user would be advantageous.

SUMMARY OF THE INVENTION

According to a first aspect of the invention, there is provided apparatus comprising a user interface for displaying a plurality of items, the apparatus being arranged:
  a) to receive at least one instruction, by which instruction or instructions, one or more of a plurality of items initially displayed on the user interface is or are categorized as an item or items to be hidden and the remaining one or more of the plurality of items initially displayed on the user interface is or are categorized as an item or items to be displayed;
  b) to receive an instruction to hide, from the user interface, the one or more items to be hidden; and
  c) to hide, from the user interface, the one or more items to be hidden, such that the item or items categorized as items to be displayed are displayed on the user interface, and the item or items categorized as items to be hidden are not displayed on the user interface.

The apparatus is arranged so that a user can choose which of the plurality of items initially displayed are to be subsequently hidden and which of the items are to be subsequently displayed. This is useful, for example, for privacy or if the apparatus is lost or stolen.

The apparatus may be arranged to request a password together with the instruction to hide the one or more items to be hidden. This improves security.

The apparatus may be arranged to receive at least one of:
  at least one instruction categorizing one or more items of the plurality of items initially displayed on the user interface as items to be hidden, the remaining items of the plurality of items being categorized as items to be displayed; and
  at least one instruction categorizing one or more items of the plurality of items initially displayed on the user interface as items to be displayed, the remaining items of the plurality of items being categorized as items to be hidden.

Thus, the user is able to select items to be hidden, the remaining items being automatically categorized as items to be displayed, or to select items to be displayed, the remaining items being automatically categorized as items to be hidden, or both.

The or each instruction receivable by the apparatus may be an instruction to categorize one item. That is, each instruction may relate to one item on the user interface.

In one embodiment, before the item(s) on the user interface categorized as files to be hidden are hidden, the item(s) on the user interface categorized as items to be hidden are displayed on the user interface with a marker. The marker shows a user which of the item(s) on the user interface are categorized as item(s) to be hidden.

In another embodiment, before the item(s) on the user interface categorized as items to be hidden are hidden, the item(s) on the user interface categorized as items to be displayed are displayed on the user interface with a marker. The marker shows a user which of the item(s) on the user interface are categorized as item(s) to be displayed.

Thus, the user can see which items are going to be displayed and which items are going to be hidden.

The apparatus may be further arranged to encrypt the item or items to be hidden.

The apparatus may be further arranged, after hiding, from the user interface, the one or more items to be hidden: to receive an instruction to display the one or more items to be hidden; and to display the one or more items to be hidden, such that the item or items categorized as items to be displayed and the item or items categorized as items to be hidden are displayed on the user interface. That is, the user can re-display all the items on the user interface. The apparatus may be arranged to request a password together with the instruction to display the one or more items to be hidden. This improves security.

The apparatus may be further arranged, after displaying the one or more items to be hidden: to receive at least one instruction, by which instruction or instructions, each item of the plurality of items is no longer categorized. That is, the items are no longer categorized either as items to be hidden or as items to be displayed.

In one embodiment, the apparatus is an electronic device for storing one or more electronic files, the plurality of items displayed on the user interface being at least some of the electronic files stored on the electronic device.

The electronic device preferably includes "UP", "DOWN", "LEFT", "RIGHT" and "SELECT" buttons. The electronic device may also include an "OPTIONS" button.

According to the first aspect of the invention, there is also provided an electronic device for storing electronic files, the electronic device comprising "UP", "DOWN", "LEFT", "RIGHT", "SELECT" and "OPTIONS" buttons and a user interface for displaying a plurality of electronic files, the electronic device being arranged:
  a) to receive at least one instruction, by which instruction or instructions, one or more of a plurality of files initially displayed on the user interface is or are categorized as a file or files to be hidden and the remaining one or more of the plurality of files initially displayed on the user interface is or are categorized as a file or files to be displayed;
  b) to receive an instruction to hide, from the user interface, the one or more files to be hidden; and
  c) to hide, from the user interface, the one or more files to be hidden, such that the file or files categorized as files to be displayed are displayed on the user interface, and the file or files categorized as files to be hidden are not displayed on the user interface.

The electronic files may be any types of electronic files, for example music files, picture files, photograph files or data files. The selected files may all be of the same category e.g. genre, date, size. The term "file" should also be taken to include folders containing one or more files. In one embodiment, the electronic device is a handheld personal digital entertainment device. The user interface may be a screen on the personal digital entertainment device.

The electronic device may be arranged to request a password together with the instruction to hide the one or more files to be hidden. This improves security.

The password may comprise data associated with a music file stored on the electronic device. For example, the music file may be a song and the associated data may be the title of the song. In that case, the electronic device may be arranged to display a prompt to select a music file from the music files stored on the electronic device. Alternatively, the password may be a number. In that case, the electronic device may be arranged to display a prompt to enter a number.

The electronic device may be arranged to receive at least one of:
  at least one instruction categorizing one or more files of the plurality of files initially displayed on the user interface as files to be hidden, the remaining files of the plurality of files being categorized as files to be displayed; and
  at least one instruction categorizing one or more files of the plurality of files initially displayed on the user interface as files to be displayed, the remaining files of the plurality of files being categorized as files to be hidden.

That is, the user may select the files to be hidden, whereby the other files are automatically selected as files to be displayed or the user may select the files to be displayed, whereby the other files are automatically selected as files to be hidden.

The or each instruction receivable by the electronic device may be an instruction to categorize one file. That is, each instruction may relate to one file on the user interface. In this case, if the user wishes to categorize several files, the corresponding number of instructions must be given.

In one embodiment, before the file(s) on the user interface categorized as files to be hidden are hidden from the user interface, the file(s) on the user interface categorized as files to be hidden are displayed on the user interface with a marker. The marker shows a user which of the files on the user interface are categorized as files to be hidden.

In an alternative embodiment, before the file(s) on the user interface categorized as files to be hidden are hidden from the user interface, the file(s) on the user interface categorized as files to be displayed are displayed on the user interface with a marker. The marker shows a user which of the files are categorized as files to be displayed.

Thus, the user can easily see which files are going to be displayed and which files are going to be hidden.

The electronic device may be further arranged to encrypt the file or files to be hidden.

An instruction categorizing a file as a file to be hidden may comprise a user highlighting a file on the user interface using one or more of the "UP", "DOWN", "LEFT" and "RIGHT" buttons, showing a menu using the "OPTIONS" button and selecting "Mark as Private" in the menu using the "UP", "DOWN" and "SELECT" buttons.

An instruction categorizing a file as a file to be displayed may comprise a user highlighting a file using one or more of the "UP", "DOWN", "LEFT" and "RIGHT" buttons, showing a menu using the "OPTIONS" button and selecting "Mark as Selected" in the menu using the "UP", "DOWN" and "SELECT" buttons.

An instruction to hide, from the user interface, the one or more files to be hidden may comprise a user entering a "Settings" area on the user interface and selecting "Show Selected Folders Only" using the "SELECT" button.

The electronic device may be further arranged, after hiding the one or more files to be hidden from the user interface: to receive an instruction to display the one or more files to be hidden; and to display the one or more files to be hidden, such that the file or files categorized as files to be displayed and the file or files categorized as files to be hidden are displayed on the user interface. That is, the user can re-display all the files.

The instruction to display the one or more files to be hidden may comprise a user entering a "Settings" area on the user interface and selecting "Show All Folders" using the "SELECT" button.

The electronic device may be arranged to request a password together with the instruction to display the one or more files to be hidden. This improves security. The password may comprise data associated with a music file stored on the electronic device. For example, the music file may be a song and the associated data may be the title of the song. In that case, the electronic device may be arranged to display a prompt to select a music file from the music files stored on the electronic device. The user may then be able to select the music file functioning as the password. Alternatively, the password may be a number. In that case, the electronic device may be arranged to display a prompt to enter a number. The user may then be able to enter a number.

The electronic device may be further arranged, after displaying the one or more files to be hidden from the user interface: to receive at least one instruction, by which instruction or instructions, each file of the plurality of files is no longer categorized.

According to a second aspect of the invention, there is provided a method for hiding one or more items of a plurality of items displayed on a user interface for a user apparatus, the method comprising the steps of:
  a) the user apparatus receiving at least one instruction, by which instruction or instructions, one or more of the plurality of items is or are categorized as an item or items to be hidden and the remaining one or more of the plurality of items is or are categorized as an item or items to be displayed;
  b) the user apparatus receiving an instruction to hide, from the user interface, the one or more items to be hidden;
  c) the user apparatus hiding the item or items to be hidden, wherein, after step c), the user interface displays the item or items categorized as items to be displayed and does not display the item or items categorized as items to be hidden.

By this method, a user can choose the items to be hidden and the items to be displayed and can, therefore, display only selected items on the user interface. This is useful, for example, for privacy or if the user apparatus is lost or stolen.

In one embodiment, step a) comprises the user apparatus receiving at least one instruction to categorize one or more items of the plurality of items as items to be hidden, the remaining items of the plurality of items being categorized as items to be displayed.

In that embodiment, the user can choose those item(s) which he would like to be hidden i.e. those items which are not to be displayed on the user interface. In one embodiment, those items are called private items. Automatically, those items which are not selected as private items are categorized as items to be displayed.

The or each instruction received by the user apparatus may be an instruction to categorize one item as an item to be hidden. That is, a single instruction may be associated with a single item.

After step a), the items categorized as items to be hidden may be displayed on the user interface with a marker. The marker indicates to a user which items are marked as items to be hidden (i.e. which are private items) so that the user will know which items are going to be displayed and which items are not going to be displayed after step c).

In another embodiment, step a) comprises the user apparatus receiving at least one instruction to categorize one or more items of the plurality of items as items to be displayed, the remaining items of the plurality of items being categorized as items to be hidden.

In that embodiment, the user can choose those item(s) which he would like to be displayed. Automatically, those items which are not selected as items to be displayed are categorized as items to be hidden.

In one case, step a) comprises the user apparatus receiving only one instruction, by which instruction, one item is categorized as an item to be displayed and wherein, after step c), the user interface displays only that one item and does not display the remaining one or more items. This is useful in the case where the user wants to display only a single item from the plurality of items on the user interface.

In another case, step a) comprises the user apparatus receiving one or more instructions, the or each instruction received by the user apparatus being an instruction to categorize one item as an item to be displayed. That is, in this case, the user wants to display one or more items on the user interface and a single instruction is associated with a single item to be displayed.

After step a), the items categorized as items to be displayed may be displayed on the user interface with a marker. The marker indicates to a user which items are marked as items to be displayed (the other items being items to be hidden) so that the user will know which items are going to be displayed and which items are not going to be displayed after step c).

In one embodiment, step b) of the user apparatus receiving an instruction to hide, from the user interface, the one or more items to be hidden may comprise the user apparatus receiving a password. This improves security as only those users who know the correct password are allowed to hide items from the user display.

The password may comprise data associated with a music file stored on the user apparatus. For example, music file may be a song and the associated data may be the title of the song. In that case, the user apparatus may provide a prompt to select a song from the songs stored on the user means and the step of the user apparatus receiving a password may comprise a user selecting a song from the songs stored on the user apparatus. Alternatively, the password may be a number. In that case, the user apparatus may provide a prompt to enter a number and the step of the user apparatus receiving a password may comprise a user entering a number.

Step c) may comprise the user apparatus encrypting the item or items to be hidden.

The method may further comprise, after step c), the steps of: d) the user apparatus receiving an instruction to display the one or more items to be hidden; and e) the user apparatus displaying the one or more items to be hidden, wherein, after step e) the user interface displays the item or items categorized as items to be displayed and the item or items categorized as items to be hidden. Thus, the user can re-display all the items.

In this case, step c) may comprise the user apparatus encrypting the item or items to be hidden. In that case, step e) may comprise the user apparatus decrypting the encrypted item or items.

Step d) may comprise the user apparatus receiving a password. This improves security as only those users who know the correct password are allowed to re-display all the items, private and non-private, on the user interface.

As before, the password may comprise data associated with a music file stored on the user apparatus. Alternatively, the password may comprise a number.

The method may further comprise, after step e), the step of: f) the user apparatus receiving at least one instruction, by which instruction or instructions, each item of the plurality of items is no longer categorized.

According to the second aspect of the invention, there is also provided a method for hiding one or more files of a plurality of files displayed on a user interface for an electronic device, the electronic device having "UP", "DOWN", "LEFT", "RIGHT", "OPTIONS" and "SELECT" buttons, the method comprising the steps of:

a) the electronic device receiving at least one instruction, by which instruction or instructions, one or more of the plurality of files is or are categorized as a file or files to be hidden and the remaining one or more of the plurality of files is or are categorized as a file or files to be displayed;

b) the electronic device receiving an instruction to hide, from the user interface, the one or more files to be hidden;

c) the electronic device hiding the file or files to be hidden, wherein, after step c), the user interface displays the file or files categorized as files to be displayed and does not display the file or files categorized as files to be hidden.

The electronic files may be any types of electronic files, for example music files, picture files, photograph files or data files. The term "file" should also be taken to include folders containing one or more files. In one embodiment, the electronic device is a personal digital entertainment device. The user interface may be a screen on the personal digital entertainment device.

In a first embodiment, step a) comprises the electronic device receiving at least one instruction to categorize one or more files of the plurality of files as files to be hidden, the remaining files of the plurality of files being categorized as files to be displayed.

In this first embodiment, the user can choose those file(s) which he would like to be hidden i.e. those files which are not to be displayed on the electronic device's user interface. In one embodiment, those files are called private files. Automatically, those files which are not selected as private files are categorized as files to be displayed.

The or each instruction received by the electronic device may be an instruction to categorize one file as a file to be hidden. That is, a single instruction may be associated with a single file.

Step a) may comprise a user highlighting a file using the "UP", "DOWN", "LEFT" and "RIGHT" buttons, showing a menu using the "OPTIONS" button and selecting "Mark as Private" in the menu using the "UP", "DOWN" and "SELECT" buttons.

After step a), the files categorized as files to be hidden may be displayed on the user interface with a marker. The marker indicates to a user which files are marked as items files to be hidden (i.e. which are private files) so that the user will know which files are going to be displayed and which files are not going to be displayed after step c).

In a second embodiment, step a) comprises the electronic device receiving at least one instruction to categorize one or more files of the plurality of files as files to be displayed, the remaining files of the plurality of files being categorized as files to be hidden.

In this second embodiment, the user can choose those file(s) which he would like to be displayed. Automatically, those files which are not selected as files to be displayed are categorized as files to be hidden.

In one case, step a) comprises the electronic device receiving only one instruction, by which instruction, one file is categorized as a file to be displayed and wherein, after step c), the user interface displays only that one file and does not display the remaining one or more files. This is useful in the case where the user wants to display only a single file from the plurality of files on the user interface.

In this case, the method may comprise a user highlighting that one file using the "UP", "DOWN", "LEFT" and "RIGHT" buttons, showing a menu using the "OPTIONS" button and selecting "Show this folder only" in the menu using the "UP", "DOWN" and "SELECT" buttons.

In another case, step a) comprises the electronic device receiving one or more instructions, the or each instruction received by the electronic device being an instruction to categorize one file as a file to be displayed. That is, in this case, the user wants to display one or more files on the user interface and a single instruction is associated with a single file to be displayed.

In this case, step a) may comprise a user highlighting a file using the "UP", "DOWN", "LEFT" and "RIGHT" buttons, showing a menu using the "OPTIONS" button and selecting "Mark as Selected" in the menu using the "UP", "DOWN" and "SELECT" buttons.

After step a), the files categorized as files to be displayed may be displayed on the user interface with a marker. The marker indicates to a user which files are marked as files to be displayed (the other files being files to be hidden) so that the user will know which files are going to be displayed and which files are not going to be displayed after step c).

In one embodiment, step b) of the electronic device receiving an instruction to hide the one or more files to be hidden comprises the electronic device receiving a password. This improves security as only those users who know the correct password are allowed to hide files from the user display.

The password may comprise data associated with a music file stored on the electronic device. For example, the music file may be a song and the associated data may be the title of the song. In that case, the electronic device may provide a prompt to select a song from the songs stored on the electronic device and the step of the electronic device receiving a password may comprise a user selecting a song from the songs stored on the electronic device. Alternatively, the password may be a number. In that case, the electronic device may provide a prompt to enter a number and the step of the electronic device receiving a password may comprise a user entering a number.

Step c) may comprise the electronic device encrypting the file or files to be hidden.

The method may further comprise, after step c), the steps of: d) the electronic device receiving an instruction to display the one or more files to be hidden; and e) the electronic device displaying the one or more files to be hidden, wherein, after step e) the user interface displays the file or files categorized as files to be displayed and the file or files categorized as files to be hidden. Thus, the user can re-display all the items.

In this case, step c) may comprise the electronic device encrypting the file or files to be hidden. In that case, step e) may comprise the electronic device decrypting the encrypted file or files.

Step d) may comprise the electronic device receiving a password. This improves security as only those users who know the correct password are allowed to re-display all the items, private and non-private, on the user interface.

As before, the password may comprise data associated with a music file stored on the electronic device. For example, the music file may be a song and the associated data may be the title of the song. In that case, the electronic device may provide a prompt to select a song from the songs stored on the electronic device and the step of the electronic device receiving a password may comprise a user selecting a song from the songs stored on the electronic device. Alternatively, the password may be a number. In that case, the electronic device may provide a prompt to enter a number and the step of the electronic device receiving a password may comprise a user entering a number.

The method may further comprise, after step e), the step of: f) the electronic device receiving at least one instruction, by which instruction or instructions, each file of the plurality of files is no longer categorized.

According to a third aspect of the invention, there is provided a method for selecting a new password or entering a predetermined password on a user apparatus for storing electronic files, the method comprising the step of the user apparatus receiving an instruction selecting an item from a listing of items displayed on the user apparatus, data associated with the selected item serving as the password.

As is clear, the term "password" does not imply a word or phrase; in this case, data associated with an item displayed on the user apparatus functions as the password. The user need not know which data associated with the item is serving as the password but simply needs to know the item itself.

In one embodiment, the listing of items is a listing of electronic files stored on the device. In that case, the electronic files stored on the device may be electronic music files stored on the device. The data associated with the electronic music file may be any suitable data, for example the title of a song in the electronic music file. Thus, even if the electronic music file itself is deleted from the user apparatus, the password can still be remembered, since the associated data can be retained even if the file itself is not.

The user apparatus is preferably an electronic device for example a personal digital entertainment device.

The electronic device may include "LEFT", "RIGHT", "UP", "DOWN" and "SELECT" buttons. In that case, the step of the user apparatus receiving an instruction selecting an item may comprise a user moving a highlighter to an item displayed on the user interface using one or more of the "UP", "DOWN", "LEFT" and "RIGHT" buttons and the user selecting the highlighted item using the "SELECT" button. The electronic device may include an "OPTIONS" button.

According to the third aspect of the invention, there is also provided a method for selecting a new password or entering a predetermined password on a user apparatus for storing electronic files, the method comprising the step of the user apparatus receiving a number, the number serving as the password.

As is clear, the term "password" does not imply a word or a phrase; in this case, a number acts as the password. The number may be any number of digits. In one preferred embodiment, the number is four digits long.

The step of the user apparatus receiving a number comprises a user entering a number between 0 and 9 at least once.

In a first embodiment, the or each step of entering a number between 0 and 9 comprises a user pressing a button on the user apparatus, each button corresponding to one of the numbers 0 to 9.

The user apparatus is preferably an electronic device for example a personal digital entertainment device.

The electronic device may include "LEFT", "RIGHT", "UP", "DOWN" and "SELECT" buttons. In that case, in the first embodiment, each of those buttons (and any other buttons on the electronic device) may correspond to a number between 0 and 9.

In a second embodiment, the user apparatus comprises "UP", "DOWN" and "SELECT" buttons and the or each step of entering a number between 0 and 9 comprises: a user scrolling through numbers 0 to 9 using the "UP" and "DOWN" buttons; and the user selecting a number between 0 to 9 using the "SELECT" button.

In this second embodiment, preferably as the user scrolls through the numbers, the numbers are displayed on a user interface on the user apparatus. Preferably, once the user has selected a number between 0 and 9 using the "SELECT" button, the user apparatus automatically allows the user to scroll through once again to select the next number between 0 and 9 if there is one.

Any features described in relation to one aspect of the invention may also be applicable to another aspect of the invention.

BRIEF DESCRIPTION OF THE DRAWINGS

Exemplary embodiments of the invention will now be described with reference to the accompanying drawings, of which:

FIG. 7 is a view of a user interface showing password selection according to a third embodiment.

DETAILED DESCRIPTION OF PREFERRED EMBODIMENTS

Three levels of protection are provided. Protection Level One caters for users who just want casual protection of their private files or folders on their Personal Digital Entertainment (PDE) device. For example, a user may wish to show another user the non-private files or folders on his PDE device while he is present. No password protection is needed for Protection Level One.

Protection Level Two provides a higher level of protection. This level caters for users who may wish to lend their PDE device to another user for a small period of time. The user is not present when the second user is using the PDE device. Password protection is available to prevent the second user from being able to look at the private files or folders.

However, for Protection Level Two, the password may be reset (for example if the user has forgotten the original password) or the password may be obtained, by connecting the PDE device to a PC having the appropriate software. Thus, it will be possible to view private files and folders if the device is connected to a PC having the appropriate software, so this level of protection is not fool-proof.

Protection Level Three provides the highest level of protection. The private files or folders cannot be viewed or the password obtained by anyone else, even if the PDE device is connected to a PC. This protects the private files or folders in the event that the PDE device is lost or stolen. For Protection Level Three, encryption and decryption of the files will need to be implemented in the device.

Figure 1:
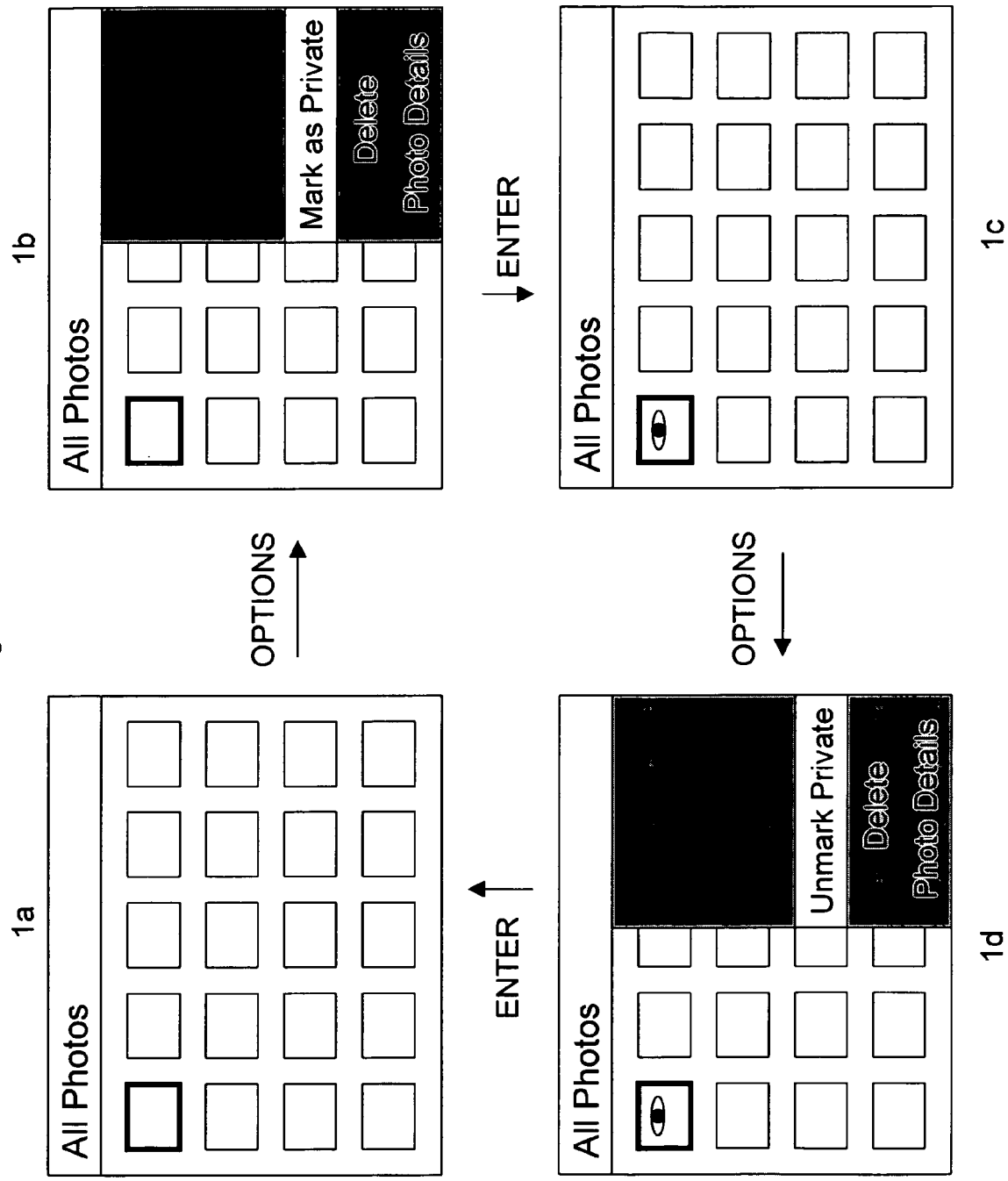
FIG. 1 is a diagram of the process of marking and unmarking files as private, according to a first embodiment of the invention.
Figure 2:
FIG. 2a is a view of a user interface showing private and non-private files.
FIG. 2b is a view of the user interface of FIG. 2a with the private files hidden.

FIGS. 1, 2a and 2b show a first embodiment of the invention. In this embodiment, files and/or folders can be marked as private and the private files and/or folders can be shown or hidden.

FIG. 1 shows the first stage for marking a non-private file or folder as private and for unmarking a private file or folder. FIG. 1 shows the process in a PDE device which has "UP", "DOWN", "LEFT", "RIGHT", "ENTER" and "OPTIONS" buttons or portions of a single button. (The "ENTER" button may alternatively be a "OK" button or a "SELECT" button or another equivalent button.)

FIG. 1 shows a user interface with an array of files, in this case photos. The user selects the photo to be marked private, using the "UP", "DOWN", "LEFT" and "RIGHT" buttons. This is shown in FIG. 1a, where the top left photo is selected. Then the user presses the "OPTIONS" button. A menu appears and the user can use the "UP" and "DOWN" buttons to move to the option "Mark As Private". This is shown in FIG. 1b. When the user presses the "ENTER" button, the selected photo is marked with a private icon. This is shown in FIG. 1c.

To unmark the photo as private, a similar process is carried out. The user selects the private photo to be unmarked private, using the "UP", "DOWN", "LEFT" and "RIGHT" buttons. Then, the user presses the "OPTIONS" button. A menu appears and the user can use the "UP" and "DOWN" buttons to move to the option "Unmark As Private". This is shown in FIG. 1d. When the user presses the "ENTER" button, the selected private photo is unmarked private and the private icon is removed, as shown in FIG. 1a.

Note that, when a private photo is selected and the user presses "OPTIONS", "Unmark As Private" will automatically appear in the menu, whereas, when a non-private photo is selected and the user presses "OPTIONS", "Mark As Private" will automatically appear in the menu.

The marking and unmarking as private has been described with reference to a PDE device that has an "OPTIONS" button. In general, for marking a file or folder as private, a particular file or folder needs to be selected or highlighted (e.g. by left-clicking it with a mouse), then the menu or display for that file or folder needs to be shown (e.g. by right-clicking with a mouse or by selecting an "options" function), then "Mark As Private" needs to be selected in the menu or display (e.g. by left-clicking with a mouse or by using "UP", "DOWN" and "ENTER" buttons). Similarly, for unmarking a private file or folder, a private file or folder needs to be selected or highlighted (e.g. by left-clicking it with a mouse), then the menu or display for that private file or folder needs to be shown (e.g. by right-clicking with a mouse or by a selecting an "options" function), then "Unmark As Private" needs to be selected in the menu or display (e.g. by left-clicking with a mouse or by using "UP", "DOWN" and "ENTER" buttons). Private files or folders are marked with a private icon.

Once a user has marked one or more files or folders as private, the user may wish those files or folders to be shown or to be hidden.

To hide private files or folders the user goes to the "Settings" area of the PDE device and selects "Private Content—Show" in the menu to toggle the status to "Private Content—Hide". After hiding the private files or folders, the user can re-show the private files or folders by going to the "Settings" area of the PDE device again and selecting "Private Content—Hide" in the menu to toggle the status to "Private Content—Show".

The above description for hiding and showing private files and folders relates to a PDE device with a "Settings" area. In general, for hiding private files or folders, a Settings menu needs to be selected and "Private Content—Show" or "Private Content—Hide" as appropriate, needs to be selected.

Typically, the Settings area of the device will be located such that it is not immediately obvious to a user who is unfamiliar with the device. This assists with security as it means that another user cannot immediately show private files or folders that were hidden or hide private files or folders that were shown.

FIG. 2a shows a user interface with an array of files, in this case photos. In FIG. 2a, photos A, H, N and Q are marked private with a private icon. However, the private photos are still shown. FIG. 2b shows the user interface of FIG. 2a after the user has hidden the private photos. In FIG. 2b, photos A, H, N and Q are no longer displayed at all.

(It should be noted that the photos in FIGS. 2a and 2b are labeled with letters of the alphabet only to assist with this description. Otherwise, it would be obvious when looking at FIG. 2b that photos A, H, N and Q are not displayed as the photos do not run in sequence.)

It has already been mentioned that three levels of protection are envisaged. It will now be explained how those three levels of protection may be applied to the first embodiment of the invention described with reference to FIGS. 1, 2a and 2b.

Protection Level One provides only casual protection, to be used, for example, when a user is present when another user looks at the device. The user can mark certain files private and hide those private files when the second user uses the device. No further protection is required.

Protection Level Two provides a little more protection, to be used, for example, when a user lends his device to another user for a short period. If the user were simply to mark certain files private and hide those files, the second user would only need to find the "Settings" area of the device to be able to show and access the private files. So password protection is also provided, as follows. When the user goes to the "Settings" area and selects "Private Content—Hide" to toggle the status to "Private Content—Show", a password is requested before the status can toggle. The password can be chosen earlier by the original user. Optionally, a password may also be requested, when the user selects "Private Content—Show" to toggle the status to "Private Content—Hide". Although, it is obviously not as important that a password be required when a user is attempting to hide certain folders as when a user is attempting to show certain folders, it may none the less be advantageous. For example, if the second user hid certain folders, this may cause confusion for the original user or may cause errors if the user is checking and updating his file collection. For Protection Level Two, password protection is provided, but the password can be obtained and the private files or folders shown or hidden simply by connecting the PDE device to a PC with the appropriate software. Thus, Protection Level Two is useful only when the second user does not have access to a PC with appropriate software.

Protection Level Three provides the highest level of protection. Just like Protection Level Two, password protection is provided but, in this case, the password cannot be obtained by connecting the device to a PC with the appropriate software. Thus, this is useful even when the second user has access to a PC with the appropriate software or to protect private content if the device is lost or stolen.

Passwords, for Protection Levels Two and Three, will be discussed further below.

Figure 3:
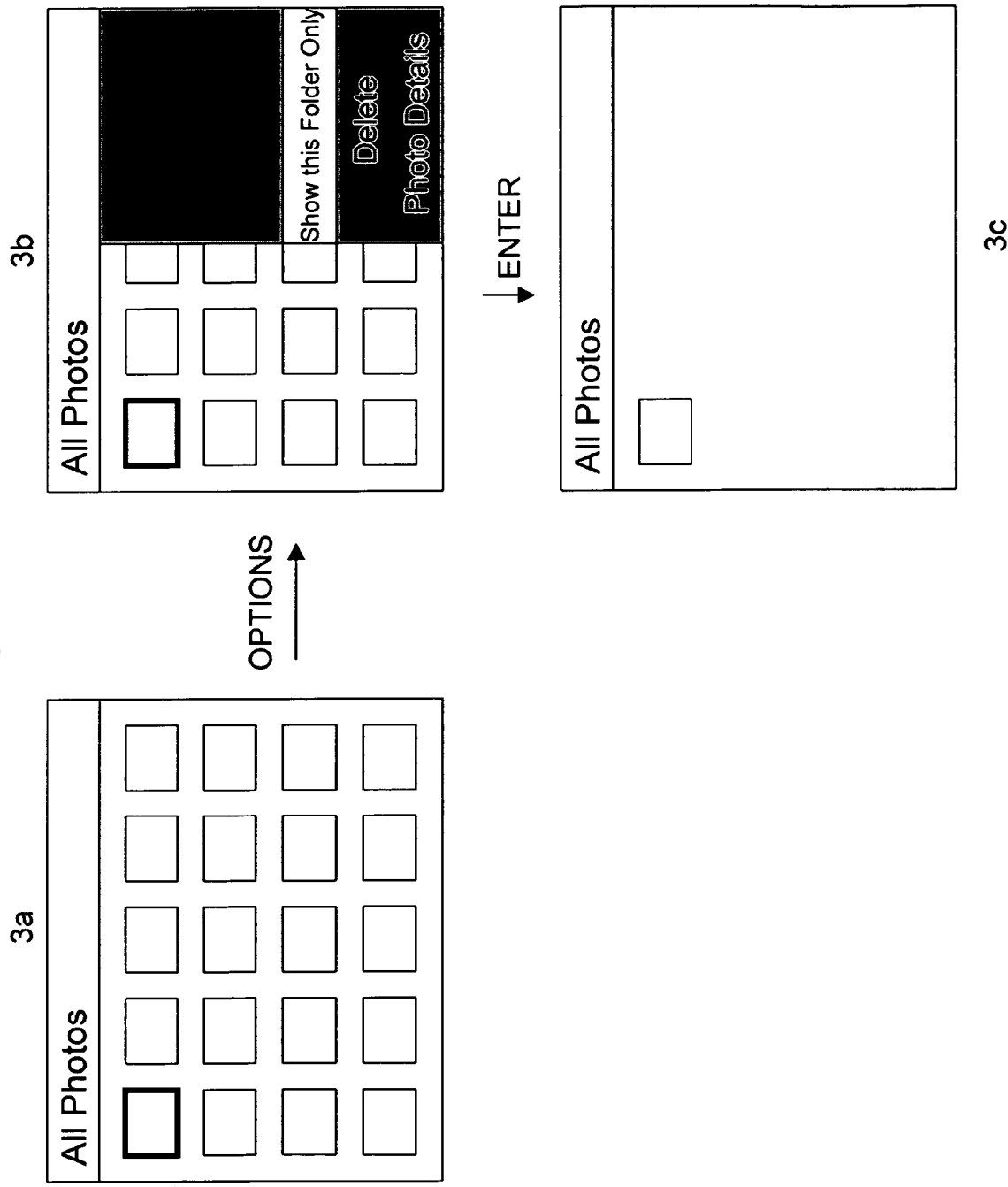
FIG. 3 is a diagram of the process of showing only a single file, according to a second embodiment of the invention.

A second embodiment of the invention will now be described with reference to FIG. 3. In this embodiment, the user may choose to show only a single file or folder. All other files and folders will be hidden. A user will then only be able to view the non-private contents of the shown file or folder.

In a PDE device, having "UP", "DOWN", "LEFT", "RIGHT", "ENTER" and "OPTIONS" buttons, the process is as follows. The user selects the file or folder to be shown, using the "UP", "DOWN", "LEFT" and "RIGHT" buttons. This is shown in FIG. 3a. Then the user presses the "OPTIONS" button. A display appears, as in the first embodiment, and the user can use the "UP" and "DOWN" buttons to move the option to "Show this Folder Only". This is shown in FIG. 3b. When the user presses the "ENTER" button, only the selected file or folder is shown; all other files and folders are hidden. This is shown in FIG. 3c. The user can only view the non-private content of the shown file or folder.

To show all the files and folders again, the user goes to the "Settings" area of the PDE device and selects "Show all Contents". All the files and folders will then be displayed.

The above description for hiding all except one file or folder relates to a PDE device with "UP", "DOWN", "LEFT", "RIGHT", "ENTER" and "OPTIONS" buttons. In general, for hiding all except one file or folder, a particular file or folder needs to be selected or highlighted (e.g. by left-clicking it with a mouse), then the menu or display for that file or folder needs to be shown (e.g. by right-clicking with a mouse or by selecting an "options" function), then "Show this Folder Only" needs be selected in the menu or display (e.g. by left-clicking with a mouse or by using "UP", "DOWN" and "ENTER" buttons). Similarly, the above description for re-showing all the files and folders relates to a PDE device with a "Settings" area. In general, for re-showing all the files and folders, a settings menu needs to be selected and "Show all Contents" needs to be selected.

As before, typically the Settings area of the device will be located such that it is not immediately obvious to a user who is unfamiliar with the device.

The first and second embodiments are really just alternative ways to achieve the same effect. If a user wishes to only display a single file or folder, he can either mark all the other files and folders as private and hide the private content (according to the first embodiment) or he can select the single file or folder and choose to show only that file or folder (according to the second embodiment). In the second embodiment, the other files or folders will not be marked as private and the second route is also considerably quicker than the first, particularly when there are a large number of files and folders. Of course, with the second embodiment, only a single file or folder is displayed, whereas, with the first embodiment, any number of files or folders may be displayed.

It has already been mentioned that three levels of protection are envisaged. It will now be explained how those three levels of protection may be applied to the second embodiment of the invention.

Protection Level One provides only casual protection, to be used, for example, when a user is present when another user is using the device. The user can choose to show only one file or folder and hide the remaining files and folders when the second user is using the device. No further protection is required.

Protection Level Two provides a little more protection, to be used, for example, when a user lends his device to another user for a short period. As with the first embodiment, if the first user were simply to hide all the files and folders except one, the second user would only need to find the "Settings" area of the device to be able to show and access the remaining files and folders. So password protection is also provided, as follows. When the user goes to the "Settings" area and selects "Show all Contents", a password is requested before the remaining files and folders can be displayed. The password can be set earlier by a user. Optionally, a password may also be requested when the user goes to the Options menu and selects "Show this Folder only". For Protection Level Two, password protection is provided, but the password can be obtained simply by connecting the PDE device to a PC with the appropriate software. Thus, Protection Level Two is useful only when the second user does not have access to a PC with appropriate software.

Protection Level Three provides the highest level of protection. Just like Protection Level Two, password protection is provided (i.e. a password is requested when a user tries to re-show all un-displayed files or folders and, optionally, when a user tries to display only a single file or folder, the remaining files and folders being hidden) but, for Protection Level Three, the password cannot be obtained by connecting the device to a PC with the appropriate software. Thus, this is useful even when the second user has access to a PC with the appropriate software or to protect private content if the device is lost or stolen.

Passwords, for Protection Levels Two and Three, will be discussed further below.

Figure 4:
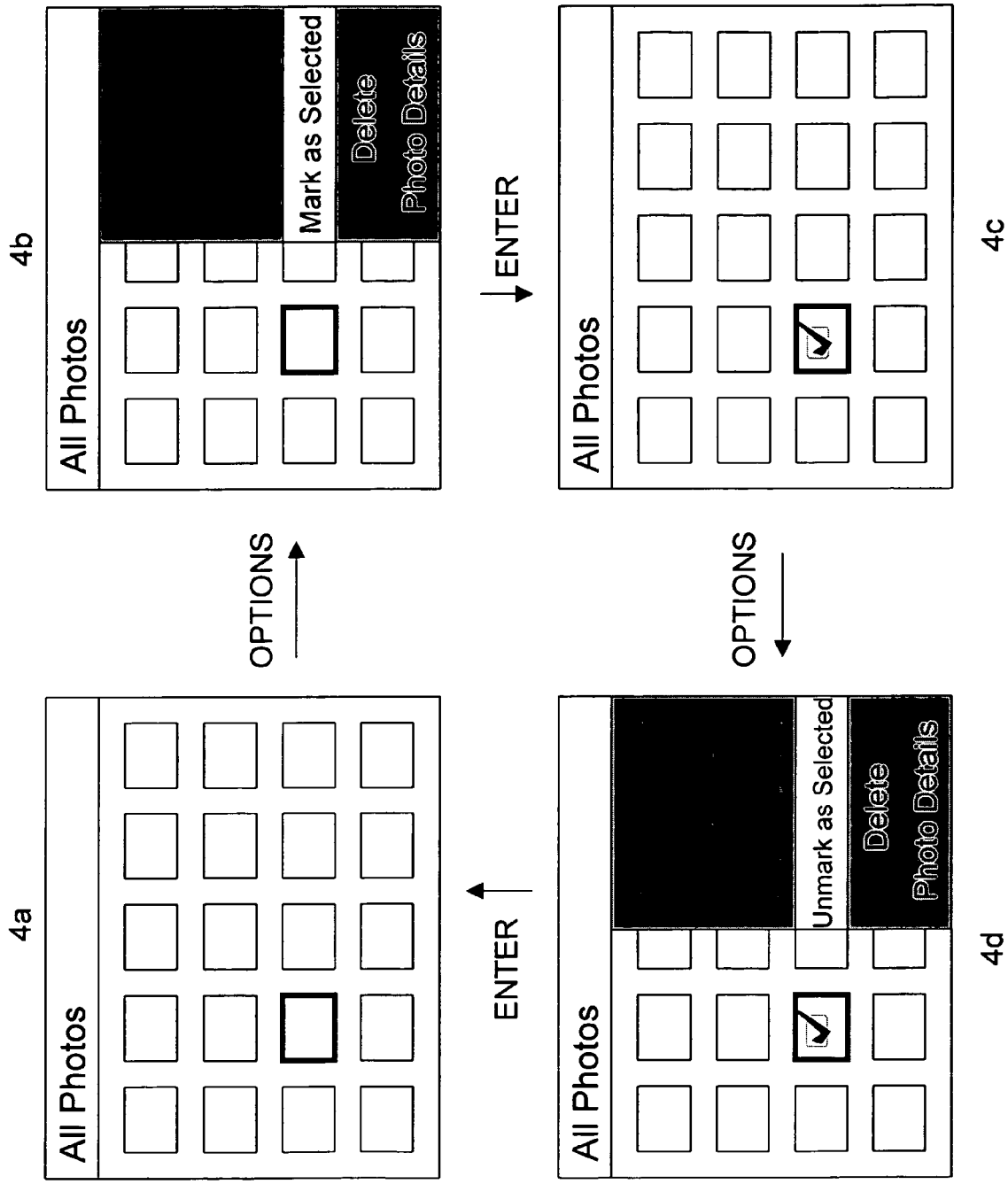
FIG. 4 is a diagram of the process of marking and unmarking files as selected, according to a third embodiment of the invention.

A third embodiment of the invention will now be described with reference to FIG. 4. In this embodiment, the user may choose to show only selected files or folders. Other files and folders will be hidden. A user will then only be able to view the non-private contents of the shown file(s) and/or folder(s). In this embodiment, there are two stages: firstly, the user selects certain files and/or folders; secondly, the user chooses to display only the selected files and folders.

In a PDE device having "UP", "DOWN", "LEFT", "RIGHT", "ENTER" and "OPTIONS" buttons, the process of the first stage is as follows. The user selects the file or folder to be marked, using the "UP", "DOWN", "LEFT" and "RIGHT" buttons. This is shown in FIG. 4a. Then the user presses the "OPTIONS" button. A menu appears, as in the first and second embodiments, and the user can use the "UP" and "DOWN" buttons to move the option to "Mark As Selected". This is shown in FIG. 4b. When the user presses the "ENTER" button, the file or folder is marked with a check icon as shown in FIG. 4c.

To unmark the file or folder as selected, a similar process is carried out. The user selects the checked file or folder to be unmarked selected, using the "UP", "DOWN", "LEFT", and "RIGHT" buttons. Then the user presses the "OPTIONS" button. A menu appears and the user can use the "UP" and "DOWN" buttons to move to the option "Unmark As Selected". This is shown in FIG. 4d. When the user presses the "ENTER" button, the selected checked file or folder is unmarked selected and the check icon is removed as shown in FIG. 4a.

Note that, when a checked file or folder is selected and the user presses "OPTIONS", "Unmark as Selected" will automatically appear in the menu, whereas, when a non-checked file or folder is selected and the user presses "OPTIONS", "Mark As Selected" will automatically appear in the menu.

The marking and unmarking as selected has been described with reference to a PDE device that has an "OPTIONS" button. In general, for marking a file or folder as selected, a particular file or folder needs to be selected or highlighted (e.g. by left-clicking it with a mouse), then the menu or display for that file or folder needs to be shown (e.g. by right-clicking it with a mouse or by selecting an "options" function), then "Mark As Selected" needs to be selected in the menu or display (e.g. by left-clicking with a mouse or by using "UP", "DOWN" and "ENTER" buttons). Similarly, for unmarking a checked file or folder, a checked file or folder needs to be selected or highlighted (e.g. by left-clicking it with a mouse), then the menu or display for that checked file or folder needs to be shown (e.g. by right-clicking with a mouse or by selecting an "options" function), then "Unmark as Selected" needs to be selected in the menu or display (e.g. by left-clicking with a mouse or by using "UP", "DOWN" and "ENTER" buttons). Selected files or folders are marked with a check icon.

Once a user has selected one or more files and/or folders, the user may opt to show only the selected folders.

To hide non-selected files or folders, the user goes to the "Settings" area of the PDE device and selects "Show Selected Folders Only" in the menu. Then, only the selected folders are displayed and only non-private content in the selected folders can be viewed. After hiding the non-selected files or folders, the user can re-show those files or folders by going to the "Settings" area of the PDE device again and selecting "Show All Contents".

The above description for hiding and showing non-selected files and folders relates to a PDE device with a "Settings" area. In general, for hiding non-selected files or folders, a settings menu needs to be selected and "Show Selected Folders Only" or "Show All Contents" as appropriate, needs to be selected.

As before, the Settings area of the device will be located such that it is not immediately obvious to a user who is unfamiliar with the device.

The first and third embodiments are really just alternative ways to achieve the same effect. If a user wishes to only display certain files or folders, he can either mark all the other files and folders as private and hide the private content (according to the first embodiment) or he can mark the certain files or folders as selected and opt to show only the selected files or folders (according to the third embodiment). If he chooses to mark all files except one as private (first embodiment) or to select only one file to be shown (third embodiment), this achieves the same effect as the second embodiment of the invention.

As before, three levels of protection are envisaged and it will now be explained how those three levels of protection may be applied to the third embodiment of the invention.

Protection Level One provides only casual protection, to be used, for example, when a user is present when another user looks at the device. The user can select certain files which are allowed to be accessed by the second user, and hide all the other files. No further protection is required.

Protection Level Two provides a little more protection, to be used, for example, when a user lends his PDE device to another user for a short period of time. As with the first and second embodiments, if the user were simply to hide certain non-selected files or folders, the second user would only need to find the "Settings" area of the device to be able to show and access all the files. So password protection is also provided, as follows. When the user goes to the "Settings" area and selects "Show All Contents", a password is requested before all the files and folders can be displayed. The password can be set earlier by a user. Optionally, a password may also be requested when the user tries to select "Show Selected Folders Only". Otherwise, the second user could potentially hide and password protect certain files so that the original user can no longer access all his files and folders. For Protection Level Two, password protection is provided, but the password can be obtained simply by connecting the PDE device to a PC with the appropriate software. Thus, Protection Level Two is useful only when the second user does not have access to a PC with appropriate software.

Protection Level Three provides the highest level of protection. Just like Protection Level Two, password protection is provided but, in this case, the password cannot be obtained by connecting the device to a PC with the appropriate software. Thus, this is useful to protect private content, for example, if the device is lost or stolen.

Passwords, for Protection Levels Two and Three, will be discussed further below.

Three levels of protection have been described and a password is required for Protection Levels Two and Three. The invention provides several new methods for choosing a password. For all the embodiments to be described below, the password can be set by a user as follows: the user goes to the "Settings" area of the device and selects "Set Password". If no password is already set, the user will be prompted to enter a new password (see embodiments below). If a password is already set, the user will be prompted to enter the existing password and then the user will be prompted to enter a new password (see embodiments below).

Figure 5:
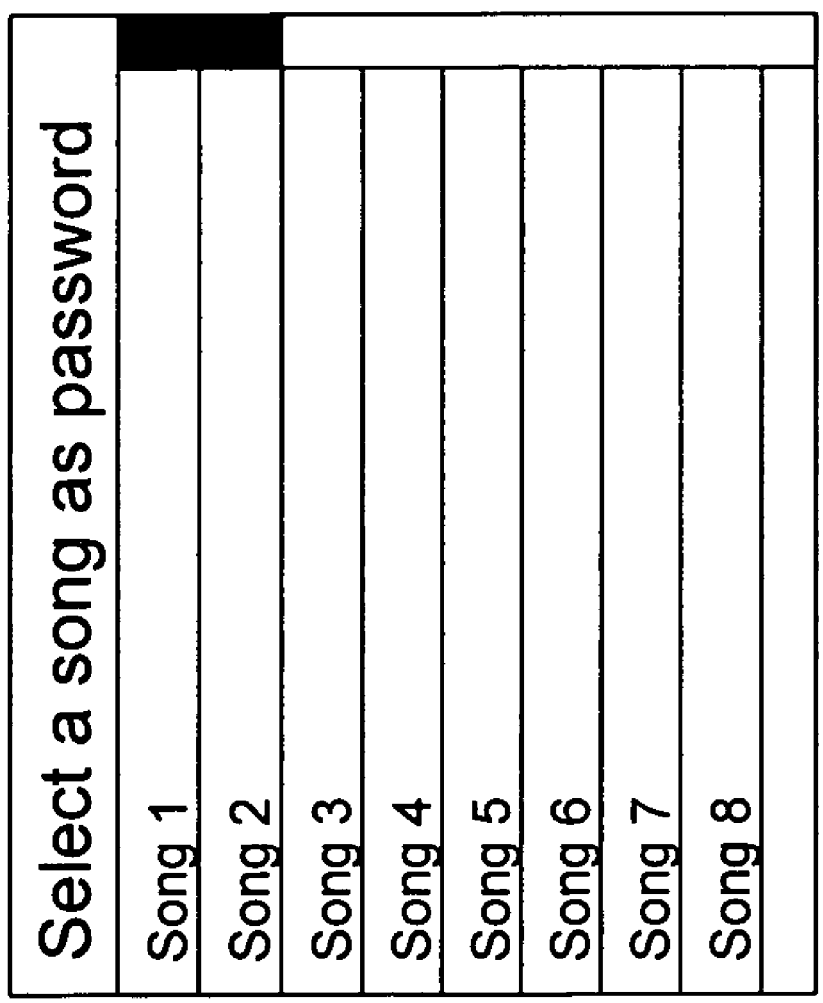
FIG. 5 is a view of a user interface showing password selection according to a first embodiment.

According to a first embodiment, when the user is prompted to enter a new password, the user can choose a song stored in the device as the password. This is shown in FIG. 5. The user is shown the list of songs and prompted to pick one of those songs as the password. In actual fact, the device stores the name of the song rather than the song itself so that, if the song is deleted from the device, the device can still display the name of the song for selection as the password. In this embodiment, when a user is prompted to enter the password (for Protection Levels Two and Three), the user will be shown the list of songs and asked to select the song. The user will only be allowed three attempts to select a song, otherwise the device will only allow another selection five minutes later. This is to make password guessing tedious.

This embodiment is particularly useful when a large number of songs is stored in the device. This makes trying to guess the song acting as the password difficult.

In this embodiment, it is not actually necessary that the songs in the displayed list be stored on the device at all. For example, the device could simply display the top thousand most popular songs (none, some or all of which could be stored in the device) from which the user could select the password. Such an "artificial" list would be useful, for example, if there are not many songs actually stored in the device.

In fact, such an "artificial" list need not comprise a list of songs. It could be a list of any suitable items e.g. a list of albums, a list of animal types, a list of boys' names.

Figure 6:
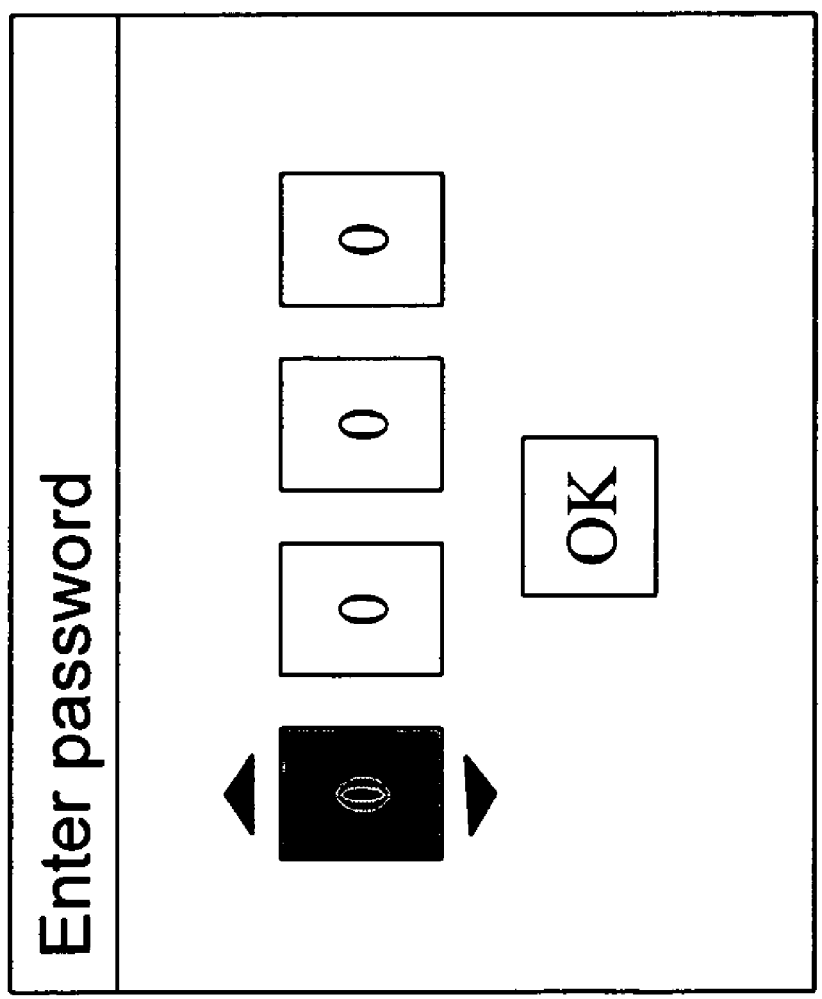
FIG. 6 is a view of a user interface showing password selection according to a second embodiment.

According to a second embodiment, when the user is prompted to enter a new password, the user can enter a series of up to four numbers like a numeric padlock. This is shown in FIG. 6. The user selects each number using the "UP" and "DOWN" buttons to scroll through numbers 0 to 9. Once that number is selected, the user presses the "RIGHT" or "ENTER" button to move to the next number for selection. Once all numbers have been selected, the user presses "ENTER" or "OK" and the password is set. A similar process is used when a user is prompted to enter the password.

According to a third embodiment, the buttons on the device are each numbered, so that each button corresponds to a number. When the user is prompted to enter a new password, the user can enter a series of numbers using the buttons on the device. The user interface displays which buttons correspond to which numbers. This is shown in FIG. 7. Any length password can be chosen. When a user is prompted to enter the password (for Protection Levels Two and Three), the user can enter the appropriate password using the buttons on the device. The advantage of this embodiment is that the input is fast. However, the numbers are limited to the number of buttons on the device.

Alternatively, in the third embodiment, each button on the device can correspond to a character. In that case, when the user is prompted to enter a password, the user can enter a series of characters using the buttons on the device. As before, any length password can be chosen and the input is fast, but the number of possible characters is limited to the number of buttons on the device.

According to a fourth embodiment (not illustrated), when the user is prompted to enter a new password, the user can say a word into the device. The device will perform a voice recording, analyze the spoken word and store it as a voice password for comparison. This embodiment, of course, requires voice recognition technology in the device.

According to a fifth embodiment (not illustrated), when the user is prompted to enter a password, the user can enter a biometric input e.g. an iris or fingerprint scan. The device will store the biometric input for comparison.

In known arrangements, the user is asked to enter a password using alphanumeric characters. In a PDE device, however, this is slow and inefficient as PDE devices typically do not have a keyboard and selection of the words and letters has to be done on screen using "UP", "DOWN", "LEFT", "RIGHT" and "ENTER" buttons. This is time-consuming. All four embodiments described above significantly increase the speed of selecting and entering a password. They maximize use of the buttons on the PDE device.

It will be appreciated by persons skilled in the art that numerous variations and/or modifications may be made to the invention as shown in the specific embodiments without departing from the scope of the invention as broadly described. The described embodiment are, therefore, to be considered in all respects illustrative and not restrictive.

The invention claimed is:

1. Apparatus comprising a user interface for displaying a plurality of items, the apparatus being arranged:
   to provide a plurality of protection levels for the plurality of items displayed in the user interface;
   to receive at least one instruction, by which instruction or instructions, one or more of a plurality of items initially displayed on the user interface is/are categorized as an item or items to be hidden and the remaining one or more of the plurality of items initially displayed on the user interface is/are categorized as an item or items to be displayed, the categorized item or items to be hidden being configurable to be re-categorized as item or items to be displayed through a setting interface;
   to receive an instruction to hide, from the user interface, the one or more items to be hidden; and
   to hide from the user interface, the one or more items to be hidden, such that the item or items categorized as items to be displayed are displayed on the user interface, and the item or items categorized as items to be hidden are not displayed on the user interface, wherein the plurality of protection levels include a first level which is associable with hiding one or more items to be hidden, a second level which is associable with a first level password and a third level which is associable with a second level password, and wherein under the second level, access to said setting interface is password protected, and under the third level, password retrieval of the second level password is disabled when the apparatus is connected to an external device.

2. Apparatus according to claim 1 wherein the apparatus is arranged to receive at least one of: at least one instruction categorizing one or more items of the plurality of items initially displayed on the user interface as items to be hidden, the remaining items of the plurality of items being categorized as items to be displayed; and at least one instruction categorizing one or more items of the plurality of items initially displayed on the user interface as items to be displayed, the remaining items of the plurality of items being categorized as items to be hidden.

3. Apparatus according to claim 1, wherein the apparatus is further arranged, after hiding, from the user interface, the one or more items to be hidden: to receive an instruction to display the one or more items to be hidden; and to display the one or more items to be hidden, such that the item or items categorized as items to be displayed and the item or items categorized as items to be hidden are displayed on the user interface.

4. Apparatus according to claim 3, wherein the apparatus is further arranged, after displaying the one or more items to be hidden:
to receive at least one instruction, by which instruction or instructions, each item of the plurality of items is no longer categorized.

5. An electronic device for storing electronic files, the electronic device comprising "UP", "DOWN", "LEFT", "RIGHT", "SELECT" and "OPTIONS" buttons and a user interface for displaying a plurality of electronic files, the electronic device being arranged:
to provide a plurality of protection levels for the plurality of files displayed in the user interface;
to receive at least one instruction, by which instruction or instructions, one or more of a plurality of files initially displayed on the user interface is/are categorized as a file or files to be hidden and the remaining one or more of the plurality of files initially displayed on the user interface is/are categorized as a file or files to be displayed, the categorized file or files to be hidden being configurable to be re-categorized as file or files to be displayed through a setting interface;
to receive an instruction to hide the one or more files to be hidden; and
to hide the one or more files to be hidden, such that the file or files categorized as files to be displayed are displayed on the user interface, and the file or files categorized as files to be hidden are not displayed on the user interface,
wherein the plurality of protection levels include a first level which is associable with hiding one or more items to be hidden, a second level which is associable with a first level password and a third level which is associable with a second level password, and
wherein under the second level, access to said setting interface is password protected, and under the third level, password retrieval of the second level password is disabled when the electronic device is connected to an external device.

6. An electronic device according to claim 5, wherein the electronic device is arranged to receive at least one of: at least one instruction categorizing one or more files of the plurality of files initially displayed on the user interface as files to be hidden, the remaining files of the plurality of files being categorized as files to be displayed; and at least one instruction categorizing one or more files of the plurality of files initially displayed on the user interface as files to be displayed, the remaining files of the plurality of files being categorized as files to be hidden.

7. An electronic device according to claim 5, wherein the electronic device is further arranged, after hiding, from the user interface, the one or more files to be hidden:
to receive an instruction to display the one or more files to be hidden; and
to display the one or more files to be hidden, such that the file or files categorized as files to be displayed and the file or files categorized as files to be hidden are displayed on the user interface.

8. An electronic device according to claim 7, wherein the electronic device is further arranged, after displaying the one or more files to be hidden:
to receive at least one instruction, by which instruction or instructions, each file of the plurality of files is no longer categorized.

9. A method for hiding one or more items of a plurality of items displayed on a user interface for a user apparatus, the method comprising the steps of:
providing a plurality of protection levels for the plurality of items displayed in the user interface;
receiving at the user apparatus at least one instruction, by which instruction or instructions, one or more of the plurality of items is/are categorized as an item or items to be hidden and the remaining one or more of the plurality of items is/are categorized as an item or items to be displayed, the categorized item or items to be hidden being configurable to be re-categorized as item or items to be displayed through a setting interface;
receiving at the user apparatus an instruction to hide, from the user interface, the one or more items to be hidden;
hiding at the user apparatus the item or items to be hidden, hiding the item or items to be hidden being associable with a first level of the plurality of protection levels;
displaying on the user interface the item or items categorized as items to be displayed and not displaying the item or items categorized as items to be hidden;
enabling password protection for access to said setting interface under a second level of the plurality of protection levels, the second level being associable with a first level password; and
disabling password retrieval of a second level password which is associable with a third level of the plurality of protection levels, when the user apparatus is connected to an external device.

10. A method according to claim 9 further comprising:
receiving at the user apparatus at least one instruction to categorize one or more items of the plurality of items as items to be displayed, the remaining items of the plurality of items being categorized as items to be hidden.

11. A method according to claim 10 further comprising:
receiving at the user apparatus only one instruction, by which instruction, one item is categorized as an item to be displayed and wherein, after hiding at the user apparatus the item or items to be hidden displaying on the user interface only that one item and not displaying the remaining one or more items.

12. A method according to claim 9, wherein the step of hiding at the user apparatus the item or items to be hidden comprises encrypting at the user apparatus the item or items to be hidden.

13. A method according to claim 9 further comprising, after the step of hiding at the user apparatus the item or items to be hidden, the steps of:
receiving at the user apparatus an instruction to display the one or more items to be hidden; and
displaying at the user apparatus the one or more items to be hidden,
wherein, after displaying at the user apparatus the one or more items to be hidden, displaying on the user interface the item or items categorized as items to be displayed and the item or items categorized as items to be hidden.

14. A method according to claim 13, wherein displaying at the user apparatus the one or more items to be hidden comprises decrypting at the user apparatus any encrypted item or items.

15. A method according to claim 13 further comprising, after displaying at the user apparatus the one or more items to be hidden, the step of:
receiving at the user apparatus at least one instruction, by which instruction or instructions, each item of the plurality of items is no longer categorized.

16. A method for hiding one or more files of a plurality of files displayed on a user interface for an electronic device, the electronic device having "UP", "DOWN", "LEFT", "RIGHT", "OPTIONS" and "SELECT" buttons, the method comprising the steps of:
providing a plurality of protection levels for the plurality of files displayed in the user interface;
receiving at the electronic device at least one instruction, by which instruction or instructions, one or more of the plurality of files is/are categorized as a file or files to be hidden and the remaining one or more of the plurality of files is/are categorized as a file or files to be displayed, the categorized file or files to be hidden being configurable to be re-categorized as file or files to be displayed through a setting interface;
receiving at the electronic device an instruction to hide, from the user interface, the one or more files to be hidden;
hiding at the electronic device the file or files to be hidden, wherein, after hiding at the electronic device the file or files to be hidden, the user interface displays the file or files categorized as files to be displayed and does not display the file or files categorized as files to be hidden, hiding the file or files to be hidden being associable with a first level of the plurality of protection levels;
enabling password protection for access to said setting interface under a second level of the plurality of protection levels, the second level being associable with a first level password; and
disabling password retrieval of a second level password associable with a third level of the plurality of protection levels, when the electronic device is connected to an external device.

17. A method according to claim 16 further comprising:
receiving at the electronic device at least one instruction to categorize one or more files of the plurality of files as files to be displayed, the remaining files of the plurality of files being categorized as files to be hidden.

18. A method according to claim 17 further comprising:
receiving at the electronic device only one instruction, by which instruction, one file is categorized as a file to be displayed and wherein, after hiding at the electronic device the file or files to be hidden, displaying on the user interface only that one file and not displaying the remaining one or more files.

19. A method according to claim 17 further comprising:
receiving at the electronic device one or more instructions, the or each instruction received by the electronic device being an instruction to categorize one file as a file to be displayed.

20. A method according to claim 16 further comprising, after hiding at the electronic device the file or files to be hidden, the steps of:
receiving at the electronic device an instruction to display the one or more files to be hidden; and
displaying at the electronic device the one or more files to be hidden,
wherein, after displaying at the electronic device the one or more files to be hidden, displaying on the user interface the file or files categorized as files to be displayed and the file or files categorized as files to be hidden.

21. A method according to claim 20 further comprising, after displaying at the electronic device the one or more files to be hidden, the step of:
receiving at the electronic device at least one instruction, by which instruction or instructions, each file of the plurality of files is no longer categorized.

* * * * *